(12) United States Patent
Porat et al.

(10) Patent No.: US 9,503,165 B2
(45) Date of Patent: Nov. 22, 2016

(54) UPLINK MULTIUSER CARRIER FREQUENCY OFFSET (CFO) ESTIMATION IN WIRELESS COMMUNICATIONS

(71) Applicant: BROADCOM CORPORATION, Irvine, CA (US)

(72) Inventors: Ron Porat, San Diego, CA (US); Tu Viet Nguyen, La Jolla, CA (US)

(73) Assignee: BROADCOM CORPORATION, Irvine, CA (US)

(*) Notice: Subject to any disclaimer, the term of this patent is extended or adjusted under 35 U.S.C. 154(b) by 138 days.

(21) Appl. No.: 14/612,800

(22) Filed: Feb. 3, 2015

(65) Prior Publication Data
US 2015/0229505 A1 Aug. 13, 2015

Related U.S. Application Data

(60) Provisional application No. 61/937,268, filed on Feb. 7, 2014.

(51) Int. Cl.
*H04W 4/00* (2009.01)
*H04B 7/04* (2006.01)
*H04B 7/06* (2006.01)
*H04L 27/26* (2006.01)
*H04L 5/00* (2006.01)

(52) U.S. Cl.
CPC .......... *H04B 7/0452* (2013.01); *H04B 7/0413* (2013.01); *H04B 7/068* (2013.01); *H04L 27/2657* (2013.01); *H04L 5/0007* (2013.01)

(58) Field of Classification Search
None
See application file for complete search history.

(56) References Cited

U.S. PATENT DOCUMENTS

| | | | | |
|---|---|---|---|---|
| 2007/0206692 A1* | 9/2007 | Kwon | ................. | H04L 27/2659 375/260 |
| 2008/0002566 A1* | 1/2008 | Zhang | ................. | H04L 27/2613 370/208 |
| 2008/0279314 A1* | 11/2008 | Liu | ..................... | H04L 27/2657 375/344 |
| 2010/0290360 A1* | 11/2010 | Ge | ...................... | H04L 27/2676 370/252 |
| 2011/0058471 A1* | 3/2011 | Zhang | ............... | H04L 25/03834 370/210 |
| 2012/0133554 A1* | 5/2012 | Bromley | ............... | G01S 5/0018 342/357.25 |
| 2013/0077463 A1* | 3/2013 | Zhang | ................. | H04L 27/2659 370/203 |
| 2013/0259173 A1* | 10/2013 | Varanese | ............... | H04L 1/0001 375/346 |
| 2013/0272364 A1* | 10/2013 | Zhang | ................... | H04L 25/022 375/231 |
| 2015/0078172 A1* | 3/2015 | Chowdiah | ............... | H04L 43/12 370/241 |

* cited by examiner

*Primary Examiner* — Otis L Thompson, Jr.
(74) *Attorney, Agent, or Firm* — Garlick & Markison; Shayne X. Short

(57) ABSTRACT

A wireless communication device includes circuitry and capability to perform carrier frequency offset (CFO) estimation based on signals received from one or more other wireless communication devices. In an orthogonal frequency division multiple access (OFDMA) implementation, the wireless communication device receives two or more OFDMA symbols from first and second other wireless communication devices that include data and a copy/repeat of that data from each of the respective first and second other wireless communication devices within specified one or more sub-carriers. The sub-carrier assignment for the first and second other wireless communication devices is made such that the first wireless communication device transmits first data and the copy of that first data using a first at least one sub-carrier, and the second wireless communication device transmits second data and the copy of that second data using a second at least one sub-carrier.

20 Claims, 10 Drawing Sheets

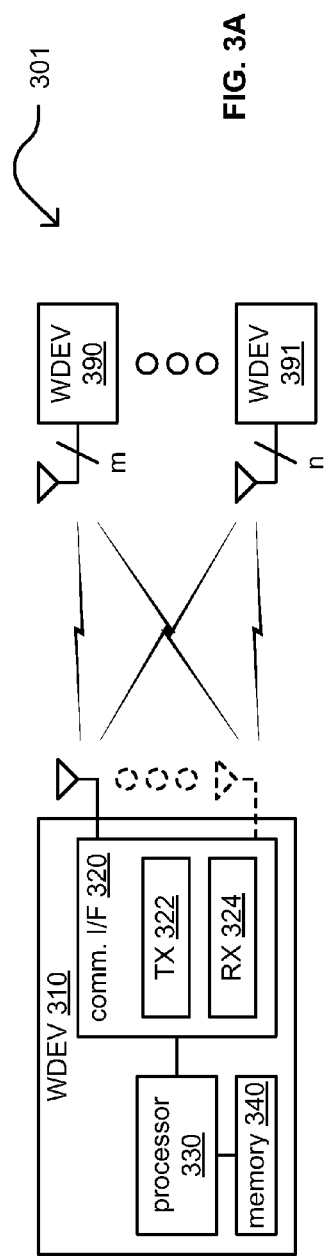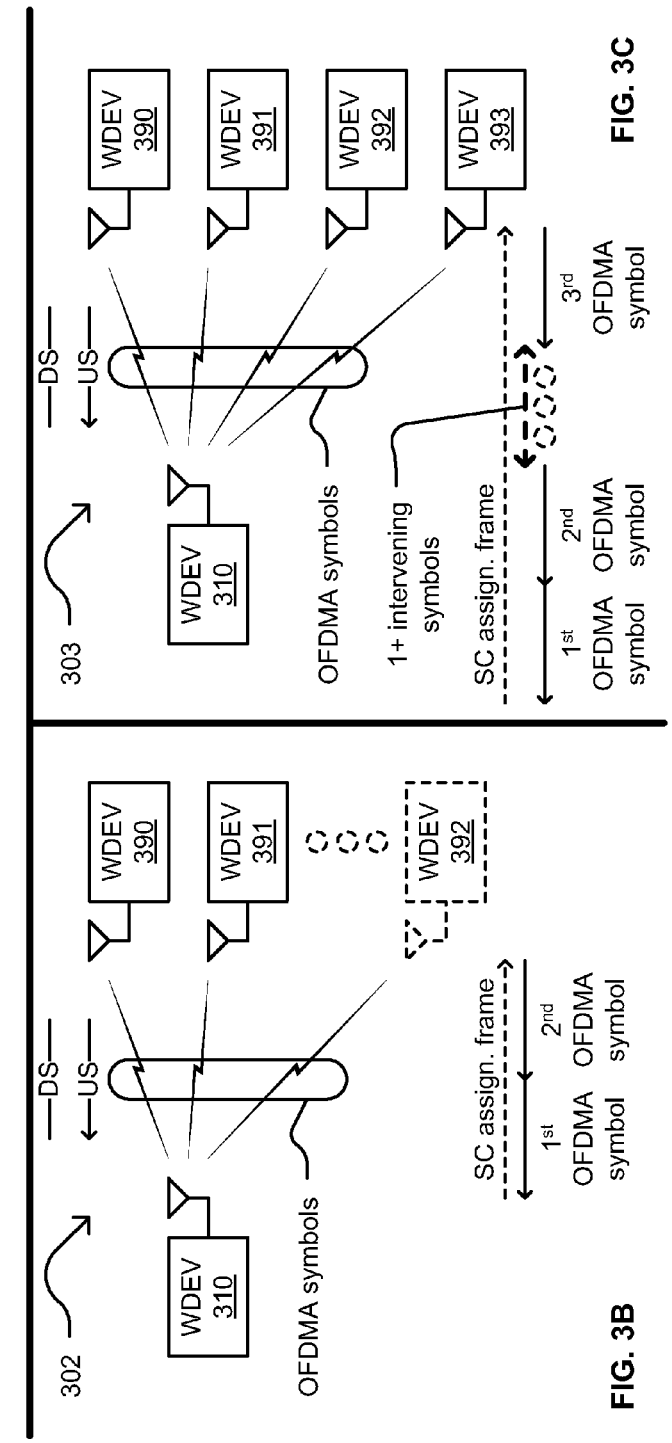

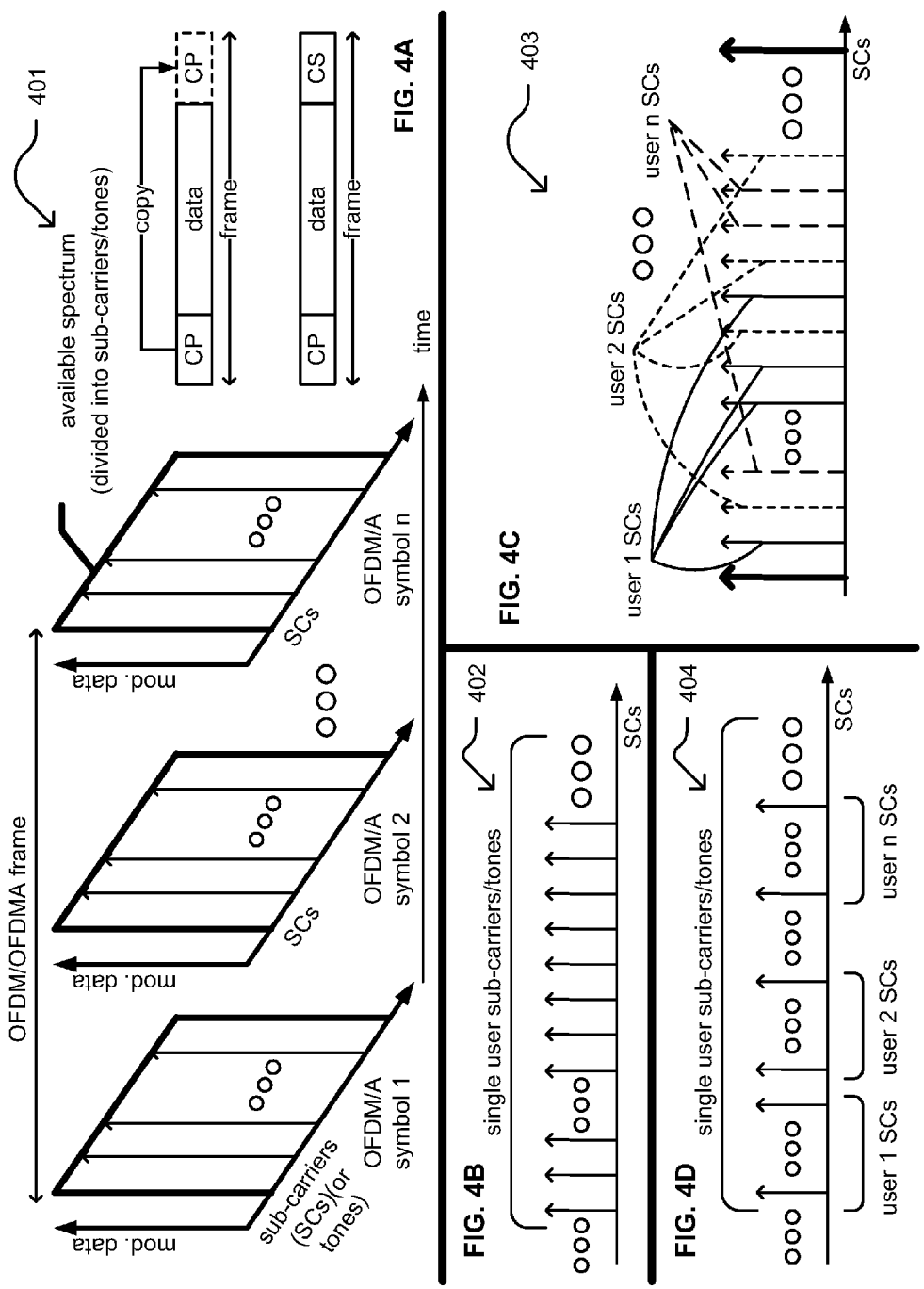

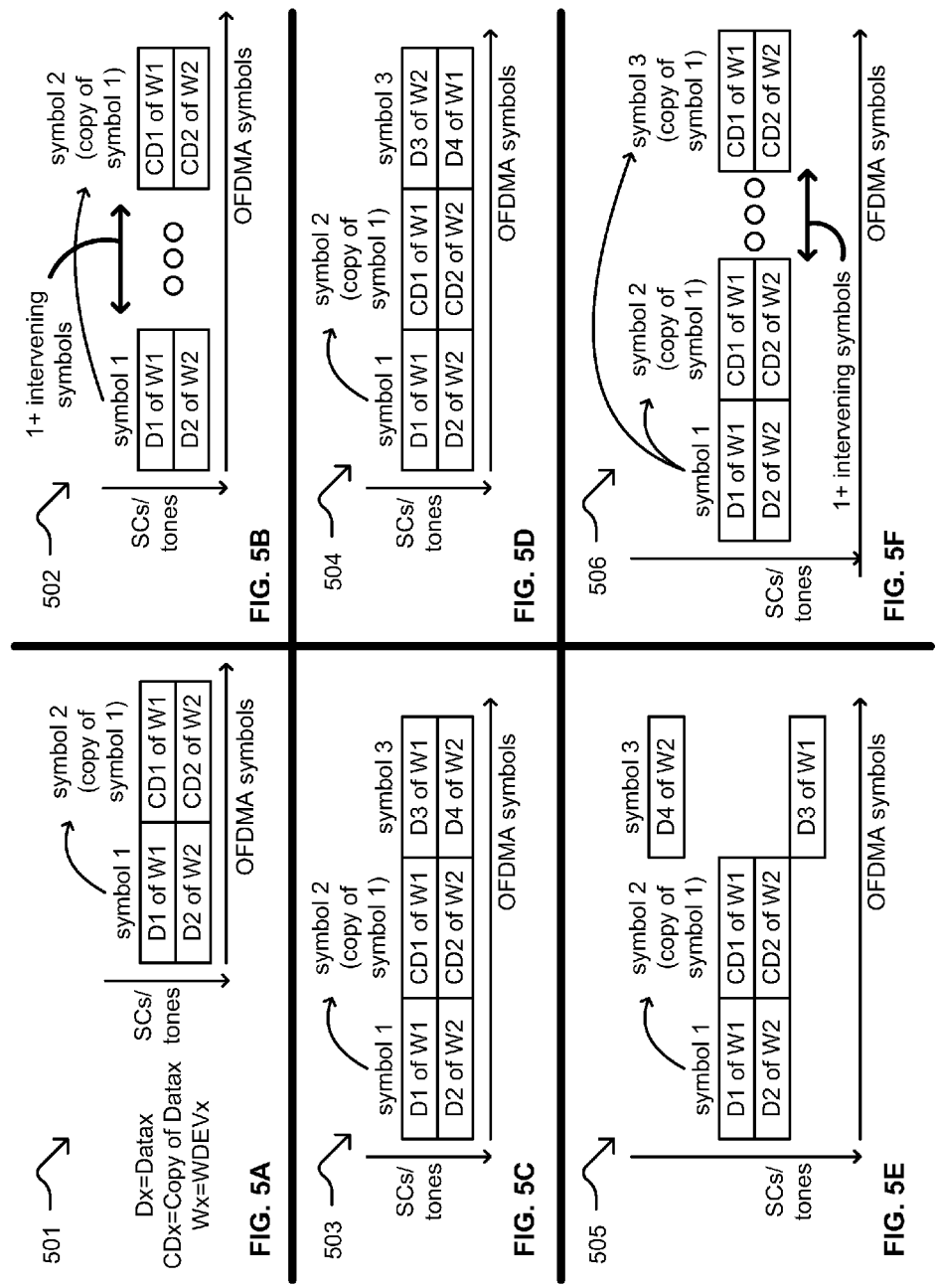

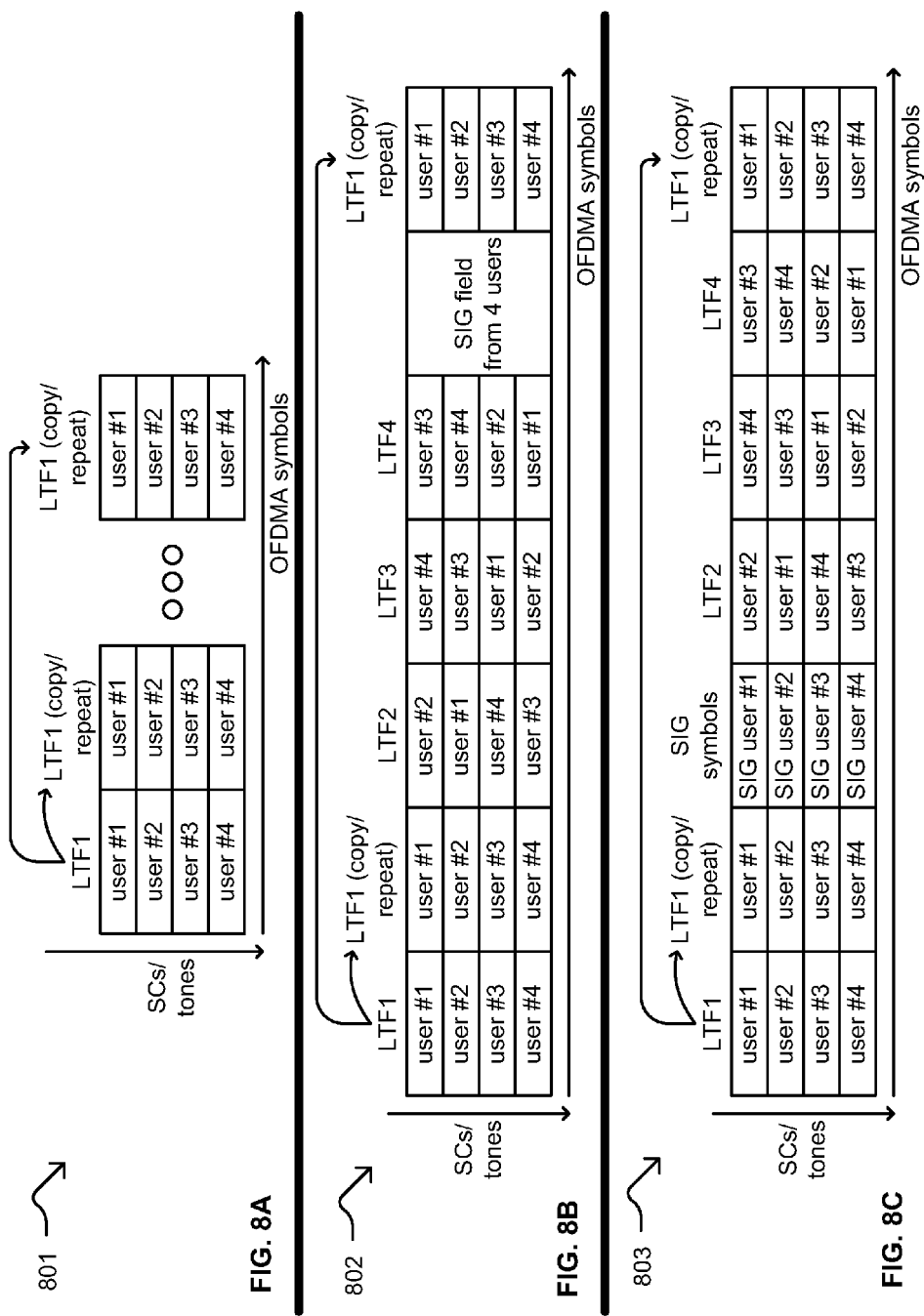

UPLINK MULTIUSER CARRIER FREQUENCY OFFSET (CFO) ESTIMATION IN WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional App. Ser. No. 61/937,268, entitled "Uplink multiuser carrier frequency offset (CFO) estimation in wireless communications," filed 02-07-2014, which is hereby incorporated herein by reference in its entirety and made part of the present U.S. Utility patent application for all purposes.

BACKGROUND

1. Technical Field

The present disclosure relates generally to communication systems; and, more particularly, to frequency and frequency offset estimation within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Within various types of wireless communication systems, synchronization between the various wireless communication devices is often performed to ensure proper communication. For example, various signals may be communicated between the devices to ensure that a given device will have accurate information regarding the operational characteristics of one or more of the other devices. There are a number of ways in which such information is communicated between devices, yet there continues to be room for improvement in the manner by which such information is determined and communicated between devices to improve overall performance of the communication system.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 5A is a diagram illustrating an example of OFDMA symbols received from other wireless communication devices for use by a wireless communication device to perform carrier frequency offset (CFO) estimation.

FIG. 5B is a diagram illustrating another example of OFDMA symbols received from other wireless communication devices for use by a wireless communication device to perform CFO estimation.

FIG. 5C is a diagram illustrating another example of OFDMA symbols received from other wireless communication devices for use by a wireless communication device to perform CFO estimation.

FIG. 5D is a diagram illustrating another example of OFDMA symbols received from other wireless communication devices for use by a wireless communication device to perform CFO estimation.

FIG. 5E is a diagram illustrating another example of OFDMA symbols received from other wireless communication devices for use by a wireless communication device to perform CFO estimation.

FIG. 5F is a diagram illustrating another example of OFDMA symbols received from other wireless communication devices for use by a wireless communication device to perform CFO estimation.

FIG. 8A is a diagram illustrating an example of OFDMA symbols that include long training fields (LTFs) received from other wireless communication devices for use by a wireless communication device to perform CFO estimation.

FIG. 8B is a diagram illustrating another example of OFDMA symbols that include LTFs received from other wireless communication devices for use by a wireless communication device to perform CFO estimation.

FIG. 8C is a diagram illustrating another example of OFDMA symbols that include LTFs received from other wireless communication devices for use by a wireless communication device to perform CFO estimation.

DETAILED DESCRIPTION

Figure 1:
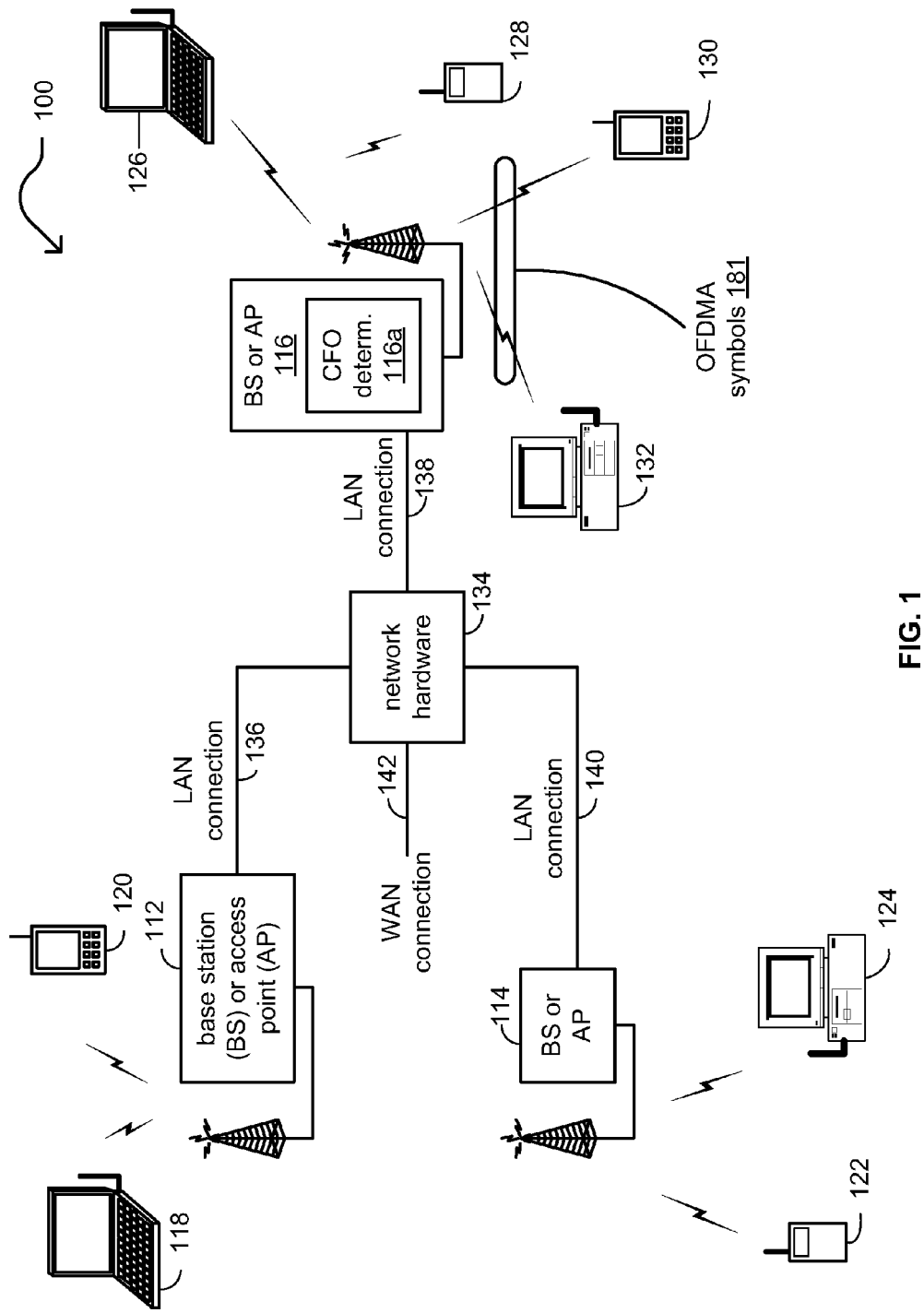
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 3A.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor and the communication interface implemented within one of the devices (e.g., any one of the WDEVs 118-132 and BSs or APs 112-116) are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391).

The processor and the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example of operation, the device 116 (e.g., a BS or AP) includes a communication interface and a processor that are configured to receive one or more signals (e.g., orthogonal frequency division multiple access (OFDMA) symbols 181) from devices 130 and 132. Considering an OFDMA example, device 130 uses a first at least one sub-carrier, and device 132 uses a second at least one sub-carrier. Generally, different subsets of sub-carriers are assigned for use by different devices. Such assignment may be dynamic, adaptive, etc. for different devices for different symbols and/or at different times. The device 116 receives a first OFDMA symbol that includes first data from device 130 modulated on a first at least one sub-carrier and second data from device 132 modulated on a second at least one sub-carrier. Then, the device 116 receives a second OFDM symbol that includes a copy or a repeat of the first data from device 130 modulated on a first at least one sub-carrier and a copy or a repeat of the second data from device 132 modulated on a second at least one sub-carrier. The device 116 processes the first data and the copy or the repeat of the first data to determine a first carrier frequency associated with device 130. The device 116 also processes the second data and the copy or the repeat of the second data to determine a second carrier frequency associated with device 132. The device 116 then determines a first carrier frequency offset (CFO) associated with device 130 and a second CFO associated with device 132 based on the first and second carrier frequencies, respectively, and a frequency reference of the device 116. Such capability within the device 116 may generally be referred to as CFO determination capability 116a. With respect to this embodiment and other embodiments or examples provided herein, note that there may be instances in which the determine CFO associated with another device is zero such that there is no CFO between the device 116 and that other device.

Generally, the device 116 operates by processing data and at least one copy or repeat of that data from another device that is included within the same at least one sub-carrier. A number of different combinations of such data and copies and/or repeats of that data may be used in various embodiments. When the device 116 determines the CFO associated with another device with which it communicates, the device 116 can modify or adapt communications to and/or from that device to compensate for any CFO that may exist between the device 116 and another device to ensure effective communications, synchronization, and improved performance of the communications between the devices.

Figure 2:
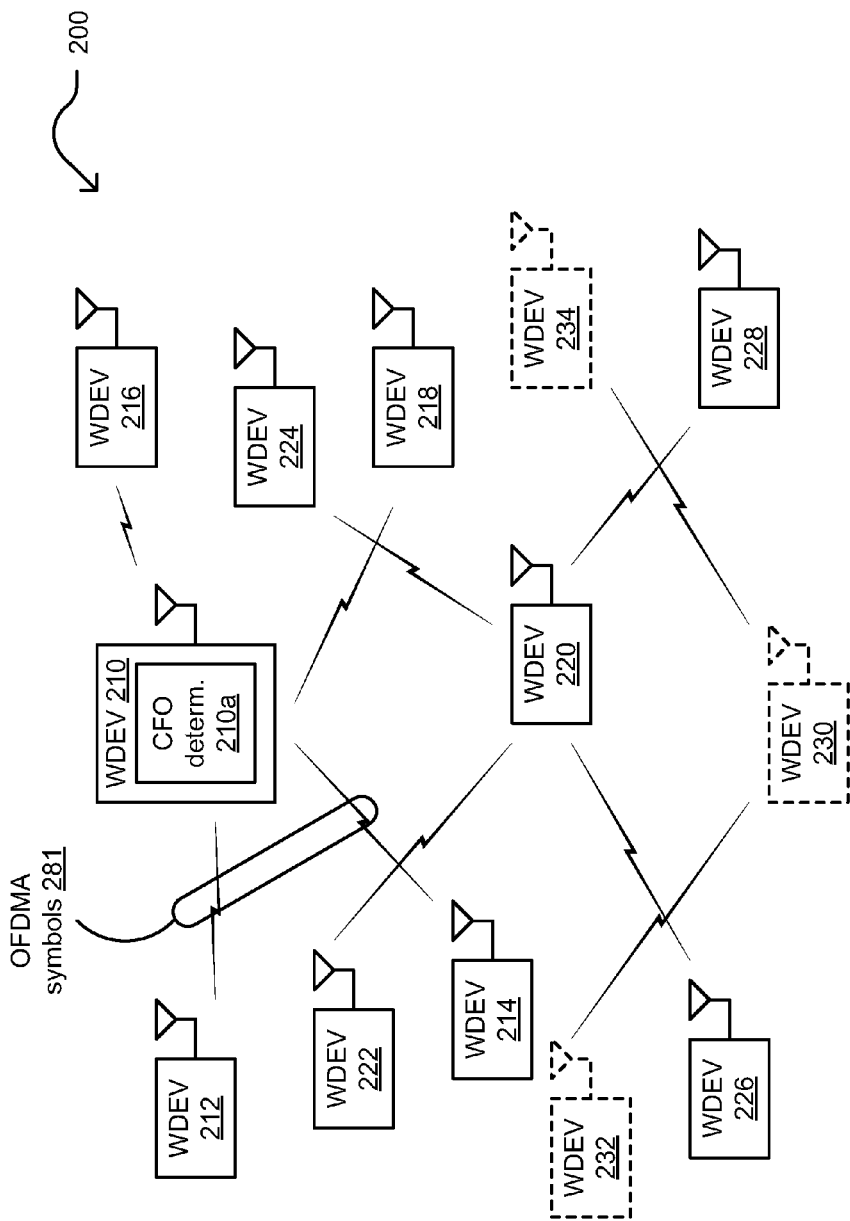
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation, WDEV 210 includes a communication interface and a processor configured to receive orthogonal frequency division multiple access (OFDMA) symbols 281 from WDEVs 212 and 214. WDEV 212 uses a first at least one sub-carrier, and WDEV 214 uses a second at least one sub-carrier. Generally, different subsets of sub-carriers are assigned for use by different devices. The WDEV 210 receives a first OFDMA symbol that includes first data from WDEV 212 modulated on a first at least one sub-carrier and second data from WDEV 214 modulated on a second at least one sub-carrier. Then, WDEV 210 receives a second OFDM symbol that includes a copy or a repeat of the first data from WDEV 212 modulated on a first at least one sub-carrier and a copy or a repeat of the second data from WDEV 214 modulated on a second at least one sub-carrier. The WDEV 210 processes the first data and the copy or the repeat of the first data to determine a first carrier frequency associated with WDEV 212. The WDEV 210 also processes the second data and the copy or the repeat of the second data to determine a second carrier frequency associated with WDEV 214. The WDEV 210 then determines a first carrier frequency offset (CFO) associated with WDEV 212 and a second CFO associated with WDEV 214 based on the first and second carrier frequencies, respectively, and a frequency reference of WDEV 210. Such capability within the WDEV 210 may generally be referred to as CFO determination capability 210a.

Note that the determination of any CFOs that may exist between the WDEV 210 and other WDEVs may be performed multiple times with respect to multiple respective other WDEVs. For example, the WDEV 210 can determine any CFOs with the WDEVs 216 and 218 at or during another time. The WDEV 210 can determine any CFOs with the WDEVs 212, 214, 216, and 218 at or during yet another time. Note also that the WDEV 210 can determine the CFO with the WDEVs 212 and 214 again at different times if desired. Generally, the determination of any CFOs by the WDEV 210 can be performed multiple times and with any desired group or combination of other WDEVs. Note also that while many examples and embodiments provided herein describe the determination of any CFOs with respect to one or more other WDEVs, similar processing operations may be performed with respect to a singular other device (e.g., such that WDEV 210 may operate to determine the CFO, in any, of only WDEV 212 at or during a given time).

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably). Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

The wireless communication device 310 also includes a processor 330 and an associated memory 340 that are configured to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include one or more antennas for transmitting and/or receiving of at least one packet or frame (e.g., WDEV 390 may include m antennae, and WDEV 391 may include n antennae).

In an example of operation, the communication interface 320 and the processor 330 of device 310 are configured to perform certain operations including transmitting and receiving of communications with devices 390 and 391 as well as processing and generation of such communications intended for or received from devices 390 and 391. In this example of operation, the device 310 is configured to receive a first orthogonal frequency division multiple access (OFDMA) symbol that includes first data from device 390 modulated on a first at least one sub-carrier and second data from device 391 modulated on a second at least one sub-carrier. The device 310 is also configured to receive a second OFDMA symbol that includes a copy of the first data from the device 390 modulated on the first at least one sub-carrier and a copy of the second data from the device 391 modulated on the second at least one sub-carrier. The device 310 is also configured to process the first data and the copy of the first data to determine a first carrier frequency associated with the device 390 and to process the second data and the copy of the second data to determine a second carrier frequency associated with the device 391. Once these first and second carrier frequencies associated with the devices 390 and 391 are known, the device 310 is also configured to determine a first carrier frequency offset (CFO) associated with the device 390 based on the first carrier frequency and a frequency reference associated with device 310, and to determine a second CFO associated with the device 391 based on the second carrier frequency and the frequency reference associated with the device 310. The frequency reference associated with the device 310 may be a current operational frequency, a baseband frequency, a reference clock frequency, a predetermined or known frequency, and/or any other frequency reference associated with the device 310.

Note also that the device 310 may be configured to determine the first and second carrier frequencies using any of a number of means. For example, the device 310 may include a filter to determine whether or not the carrier frequency of the data and the copy of the data modulated on one or more sub-carriers have a particular value. In the event the data and the copy of the data have two different values, an average, a geometric mean, or a weighted mean, etc. of the two different values may be used to estimate the actual carrier frequency associated with the device that transmitted that data and the copy of that data. The device 310 may include various components such as any one or more of a frequency locked loop (FLL), a phase locked loop (PLL), a filter (e.g., fixed, tunable, selective, or adaptive, etc. and of any desired type such as bandpass, band stop, lowpass, notch, Butterworth, etc.), spectrum analyzer circuit(s), spectrum analysis capability, etc. and/or any other means for use to determine a carrier frequency of the data and the copy of the data modulated on one or more sub-carriers. Regardless of the particular manner by which the carrier frequency of the data and the copy of the data is determined, once that carrier frequency is known, the device 310 compares that carrier frequency to the frequency reference associated with the device 310 to determine any CFO of that data and the copy of the data associated with the device 390 or 391. In general, the carrier frequency of the data and the copy of the data may be viewed as the central frequency that is the average, a geometric mean, or a weighted mean, etc. between respective upper and lower cutoff frequencies.

Note that the assignment of sub-carriers for the devices 390 and 391 may be implemented in a number of different ways. For example, the assignment of sub-carriers for use by the devices 390 and 391 may be known 'a priori' or beforehand, determined during association such as those provided from the device 310 or determined based on communication and coordination between the devices 310, 390, and/or 391, etc. Regardless of the manner in which assignment of sub-carriers is made for the devices 390 and 391, data and copies or repeats of that data are included within two or more OFDMA symbols transmitted from the devices 390 and 391 to the device 310 for use by the device 310 to determine any CFOs associated with the devices 390 and 391 relative to the device 310. In general, the assignment of sub-carriers for the devices 390 and 391 is made before the device 310 receives the two or more OFDMA symbols transmitted from the devices 390 and 391 for use to determine any CFOs associated with those devices.

Note also that the data that is modulated within the one or more sub-carriers assigned to one of the devices 390 or 391 can be of any desired form or type. The data may be predetermined or defined, known 'a priori' or beforehand, selected by one or more of the devices 310, 390, and/or 391, etc. As long as the data is known by both the transmitting device (e.g., 390) and the receiving device (e.g., 310), and as long as the one or more sub-carriers on which that data is modulated is known within the appropriate two or more OFDMA symbols, then the receiving device (e.g., 310) can process that data to determine any CFO that exists between the transmitting device (e.g., 390) and the receiving device (e.g., 310). Note also that the reverse operation can be performed such that device 390 can receive communications from device 310 and determine if any CFO exists between those devices.

FIG. 3B is a diagram illustrating another example 302 of communication between wireless communication devices. In this example 302, the device 310 is configured to transmit and receive OFDMA symbols with other devices including device 390, device 391, and optionally even more devices up to device 392. The device 310 receives two or more OFDMA symbols (e.g., shown as $1^{st}$ OFDMA symbol and $2^{nd}$ OFDMA symbol) transmitted from devices 390-391 (or from devices 390-392). In some examples, the device 310 provides a sub-carrier assignment frame to the devices 390-391 (or devices 390-392) before those devices transmit the OFDM symbols to the device 310. The device 310 processes first data and a copy or repeat of the first data from device 390 modulated on a first at least one sub-carrier and second data and a copy or repeat of the second data from device 391 modulated on a second at least one sub-carrier to determine any CFOs of devices 390-391 relative to device 310. Once any CFO of those devices is known, the device 310 can modify or adapt communications intended for or received from the devices 390-391 based on any CFO associated with those devices to ensure effective communication and improved performance of communications between the devices. Considering an example in which device 310 is an access point (AP) and the devices 390-392 are wireless stations (STAs), then a downstream/downlink direction may be viewed as from device 310 to the devices 390-392, and an upstream/uplink direction may be viewed as from the devices 390-392 to the device 310.

FIG. 3C is a diagram illustrating another example 303 of communication between wireless communication devices. In this example 303, the device 310 is configured to transmit and receive OFDMA symbols with other devices including device 390, 391, 392, and 393. Generally speaking, the device 310 may be configured to communicate with one or more other devices up to N devices (e.g., where N is any positive integer greater than or equal 1). In this diagram, the device 310 receives a $1^{st}$ OFDMA symbol followed by a $2^{nd}$ OFDMA symbol from devices 390-393. The device 310 then receives a $3^{rd}$ OFDMA symbol such that one or more intervening symbols are included between the $2^{nd}$ OFDMA and the $3^{rd}$ OFDMA symbol. Note that these one or more intervening symbols may or may not include data and copies or repeats of data associated with any one of the devices 390-393 for use in determining any CFO associated with those devices relative to device 310. For example, these one or more intervening symbols may include other information besides that which is used to determine any CFO associated with those devices relative to device 310. Considering an example in which device 310 is an AP and the devices 390-393 are STAs, then a downstream/downlink direction may be viewed as from device 310 to the devices 390-393, and an upstream/uplink direction may be viewed as from the devices 390-393 to the device 310.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 4A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA.

Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are inter-mingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

Generally, any communication device described herein may be configured to include a processor and the communication interface configured to process received OFDM or OFDMA symbols and/or frames and to generate such OFDM or OFDMA symbols and/or frames.

With respect to OFDMA symbol and/or packet/frame format, a general format of an OFDMA packet/frame may include at least one short training field (STF), at least one long training field (LTF), at least one signal field (SIG) implemented within a preamble of the OFDMA packet followed by at least one data field or payload of the OFDMA packet/frame. In one example of an OFDMA packet/frame, the first at least one field includes first short training field (STF) followed by first long training field (LTF) followed by at least one first signal field (SIG), and the second at least one field includes second STF followed by second LTF followed by at least one second SIG followed by at least one data field or payload of the OFDMA packet/frame. In another example of an OFDMA packet/frame, the first at least one field includes short training field (STF) followed by first long training field (LTF) followed by at least one first signal field (SIG), the second at least one field includes second LTF followed by at least one second SIG followed by at least one data field or payload of the OFDMA packet/frame. Note that other OFDMA frame/packet formats may include one or more legacy fields for use by other devices including those that are compliant with prior versions of communication standards, protocols, and/or recommended practices including those related to various versions, amendments, and extensions of IEEE 802.11. Often times such legacy fields are indicated in diagrams as including the prefix "L-" that specifies "Legacy".

Note also that various communications between devices may be performed using an OFDMA packet format that includes two or more OFDMA symbols within a multiple user (MU) transmission from two or more devices. As mentioned above, the specific contents of data and a copy or repeat of that data included within one or more sub-carriers may be of any type. In one specific example, the data includes a long training field (LTF) and the copy or repeat of the data is a copy of that LTF.

As described herein, this disclosure describes many novel mechanisms to enable a wireless communication device (e.g., a receiver, a transceiver, an access point (AP), a wireless station (STA), etc.) to receive packets from one user and/or multiple users simultaneously for use in estimating the carrier frequency offset (CFO) of each one of them. In some examples, a wireless communication device is configured only to receive packets from one wireless communication device or source at a time, and the packet structure of such received packets are built such that CFO estimation is performed based on the first short training field (STF) and long training field (LTF) fields.

This disclosure presents a novel approach that uses a common data structure from a respective user or wireless communication device that is repeated at least twice in a common at least one sub-carrier. In one example, the data structure includes an LTF structure that is repeated twice. However, note that any type of data structure may be used. Also, this structure allocates a different subset of the tones or sub-carriers to each wireless communication device or user (e.g., a subset of sub-carriers could be at least one sub-carrier for each respective user, a contiguous set of tones or non-contiguous distributed non-overlapping set of tones for each respective user, etc.).

An appropriate CFO estimation tailored for maximum range (with perhaps reduced accuracy) is employed using two or more OFDMA symbols that are spaced as closely as possible (e.g., two OFDMA symbols being adjacent in time, successive and adjacent, or adequately close to one another in time according to some parameter). For two OFDM symbols separated by a period of time T [sec], then the maximum theoretical CFO correction range is ½T [Hz].

An appropriate CFO estimation tailored for accuracy or maximum accuracy (with perhaps reduced range) is employed using two or more OFDMA symbols that are spaced relatively far apart for accuracy (e.g., with one or more intervening symbols there between). An appropriate OFDMA symbol length is employed to provide for a design of at least two OFDM symbol lengths that may be supported (e.g., 4 micro-seconds (μs) and 16 μs impacting the estimation range and accuracy).

In order to provide these design considerations, a flexible structure is proposed where two or more OFDMA symbols (e.g., LTF symbols in some examples) are placed such that the required range and accuracy are satisfied. Also, this disclosure proposes to allow a wireless communication device that receives simultaneous transmissions to indicate in a trigger frame the exact number and spacing of the identical OFDMA (e.g., LTFs) symbols that are used so that the optimal configuration may be used depending on the symbol length, required accuracy (higher number of spatial streams or higher MCS require higher accuracy) and the required range.

Several of the following diagrams show various examples by which data and copies or repeats of data may be included within particular sub-carriers of various OFDMA symbols for use in performing CFO estimation. A given device may use the data (e.g., D1, D2, D3, D4, etc.) and copies of the data (e.g., CD1, CD2, CD3, CD4, etc.) from the various wireless communication devices (e.g., depicted as W1, W2, W3, W4, etc.) to determine any CFO associated with those devices.

FIG. 5A is a diagram illustrating an example 501 of OFDMA symbols received from other wireless communication devices for use by a wireless communication device to perform carrier frequency offset (CFO) estimation. This diagram shows first data (D1) of a first wireless communication device (W1) and a copy of the first data (CD1) of W1 included within a first at least one sub-carrier within two successive and adjacent symbols, and it also shows second data (D2) of a second wireless communication device (W2) and a copy of the second data (CD2) of W2 included within a second at least one sub-carrier within those two successive and adjacent symbols.

FIG. 5B is a diagram illustrating another example 502 of OFDMA symbols received from other wireless communication devices for use by a wireless communication device to perform CFO estimation. This diagram shows D1 and CD1 of W1 included within a first at least one sub-carrier within two symbols that are not immediately successive and adjacent such that one or more inter-meaning symbols is placed there between, and also shows D2 and CD2 of W2 included within a second at least one sub-carrier within those same two symbols.

FIG. 5C is a diagram illustrating another example 503 of OFDMA symbols received from other wireless communication devices for use by a wireless communication device to perform CFO estimation. This diagram shows D1 and CD1 of W1 included within a first at least one sub-carrier within two successive and adjacent symbols and third data (D3) of W1 included within the first at least one sub-carrier within a following, third symbol. This diagram shows D2 and CD2 of W2 included within a second at least one sub-carrier within two successive and adjacent symbols and fourth data (D4) of W2 included within the second at least one sub-carrier within the following, third symbol.

FIG. 5D is a diagram illustrating another example 504 of OFDMA symbols received from other wireless communication devices for use by a wireless communication device to perform CFO estimation. This diagram shows D1 and CD1 of W1 included within a first at least one sub-carrier within two successive and adjacent symbols and D3 of W2 (note: not W1 in this diagram) included within the first at least one sub-carrier within a following, third symbol. This diagram shows D2 and CD2 of W2 included within a second at least one sub-carrier within two successive and adjacent symbols and D4 of W1 (note: not W2 in this diagram) included within the second at least one sub-carrier within the following, third symbol. As can be seen in this diagram, the same at least one sub-carrier may be used for data from different devices at different times. Generally speaking, the various sub-carriers may be assigned in an interleaved manner such that any given sub-carrier may be assigned to different devices four different symbols and at different times.

FIG. 5E is a diagram illustrating another example 505 of OFDMA symbols received from other wireless communication devices for use by a wireless communication device to perform CFO estimation. In the first and second symbols, this diagram shows D1 and CD1 of W1 included within a first at least one sub-carrier and D2 and CD2 of W2 included within a second at least one sub-carrier. In a third symbol, this diagram shows D3 of W1 in a third at least one sub-carrier and D4 of W2 in a fourth at least one sub-carrier. Note that the third and the fourth at least one sub-carriers are not the same as either of the first or second at least one sub-carriers. Again, generally speaking, the sub-carrier assignment for data from various the devices may be adaptively changed for different symbols and at different times. Note that a given sub-carrier may be used for data from more than one device.

FIG. 5F is a diagram illustrating another example 506 of OFDMA symbols received from other wireless communication devices for use by a wireless communication device to perform CFO estimation. In the first and second symbols, this diagram shows D1 and CD1 of W1 included within a first at least one sub-carrier and D2 and CD2 of W2 included within a second at least one sub-carrier. Then, after one or more intervening symbols, a third symbol also includes CD1 of W1 included within the first at least one sub-carrier and CD2 of W2 included within the second at least one sub-carrier. In this diagram, the symbol 2 includes a copy or repeat of at least D1 of W1 and D2 of W2 in the first and second at least one sub-carriers, and then symbol 3, which is separated from symbol 2 by one or more intervening symbols, also includes copy or repeat of at least D1 of W1 and D2 of W2 in the first and second at least one sub-carriers.

In certain of the following diagrams, a blank block shown within a given symbol may include any desired data or even be void of any data. Generally, any blank block can include any desired data or include no data or information whatsoever.

Figure 6A:
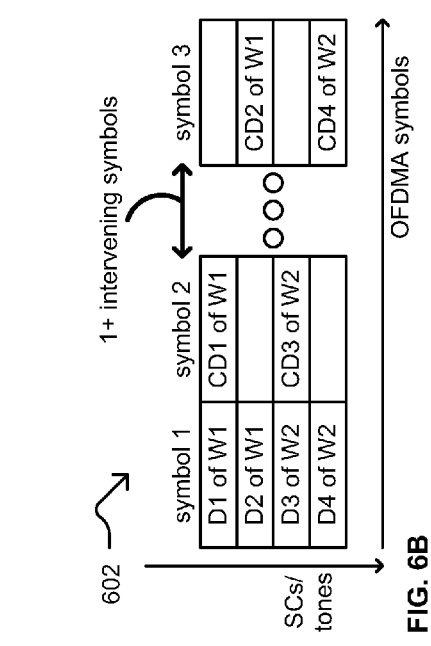
FIG. 6A is a diagram illustrating another example of OFDMA symbols received from other wireless communication devices for use by a wireless communication device to perform CFO estimation.
Figure 6B:
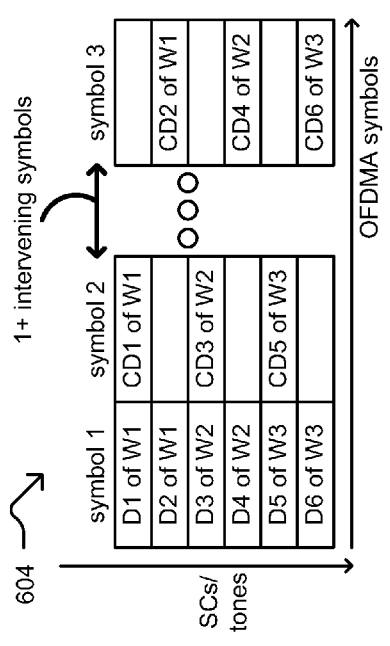
FIG. 6B is a diagram illustrating another example of OFDMA symbols received from other wireless communication devices for use by a wireless communication device to perform CFO estimation.

FIG. 6A is a diagram illustrating another example 601 of OFDMA symbols received from other wireless communication devices for use by a wireless communication device to perform CFO estimation. In this diagram, a first symbol includes D1 of W1 in a first at least one sub-carrier and D2 of W1 in a second at least one sub-carrier. The first symbol also includes D3 of W2 in a third at least one sub-carrier and D4 of W2 in a fourth at least one sub-carrier. A second symbol includes CD1 of W1 in the first at least one sub-carrier and CD3 of W2 in the third at least one sub-carrier. A third symbol includes CD2 of W1 in the second at least one sub-carrier and CD4 of W2 in the fourth at least one sub-carrier. The first, second, and third symbols are all successive and adjacent to one another as shown in the diagram FIG. 6B is a diagram illustrating another example 602 of OFDMA symbols received from other wireless communication devices for use by a wireless communication device to perform CFO estimation. This diagram includes a similar format to example 601 of FIG. 6A with at least one difference being that one or more intervening symbols are included between the second symbol and the third symbol.

Figure 6C:
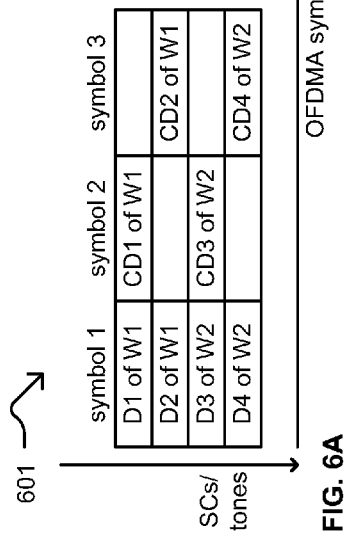
FIG. 6C is a diagram illustrating another example of OFDMA symbols received from other wireless communication devices for use by a wireless communication device to perform CFO estimation.

FIG. 6C is a diagram illustrating another example 603 of OFDMA symbols received from other wireless communication devices for use by a wireless communication device to perform CFO estimation. In this diagram, a first symbol includes D1 of W1 in a first at least one sub-carrier and D2 of W1 in a second at least one sub-carrier. The first symbol also includes D3 of W2 in a third at least one sub-carrier and D4 of W2 in a fourth at least one sub-carrier. The first symbol also includes D5 of W3 in a fifth at least one sub-carrier and D6 of W3 in a sixth at least one sub-carrier.

A second symbol includes CD1 of W1 in the first at least one sub-carrier, CD3 of W2 in the third at least one sub-carrier, and CD5 of W3 in the fifth at least one sub-carrier. A third symbol includes CD2 of W1 in the second at least one sub-carrier, CD4 of W2 in the fourth at least one sub-carrier, and CD6 of W6 in the sixth at least one sub-carrier. The first, second, and third symbols are all successive and adjacent to one another as shown in the diagram.

Figure 6D:
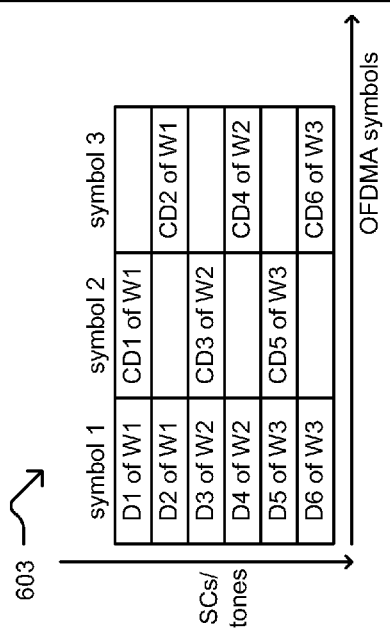
FIG. 6D is a diagram illustrating another example of OFDMA symbols received from other wireless communication devices for use by a wireless communication device to perform CFO estimation.

FIG. 6D is a diagram illustrating another example 604 of OFDMA symbols received from other wireless communication devices for use by a wireless communication device to perform CFO estimation. This diagram includes a similar format to example 603 of FIG. 6C with at least one difference being that one or more intervening symbols are included between the second symbol and the third symbol.

Figures 7A, 7B:
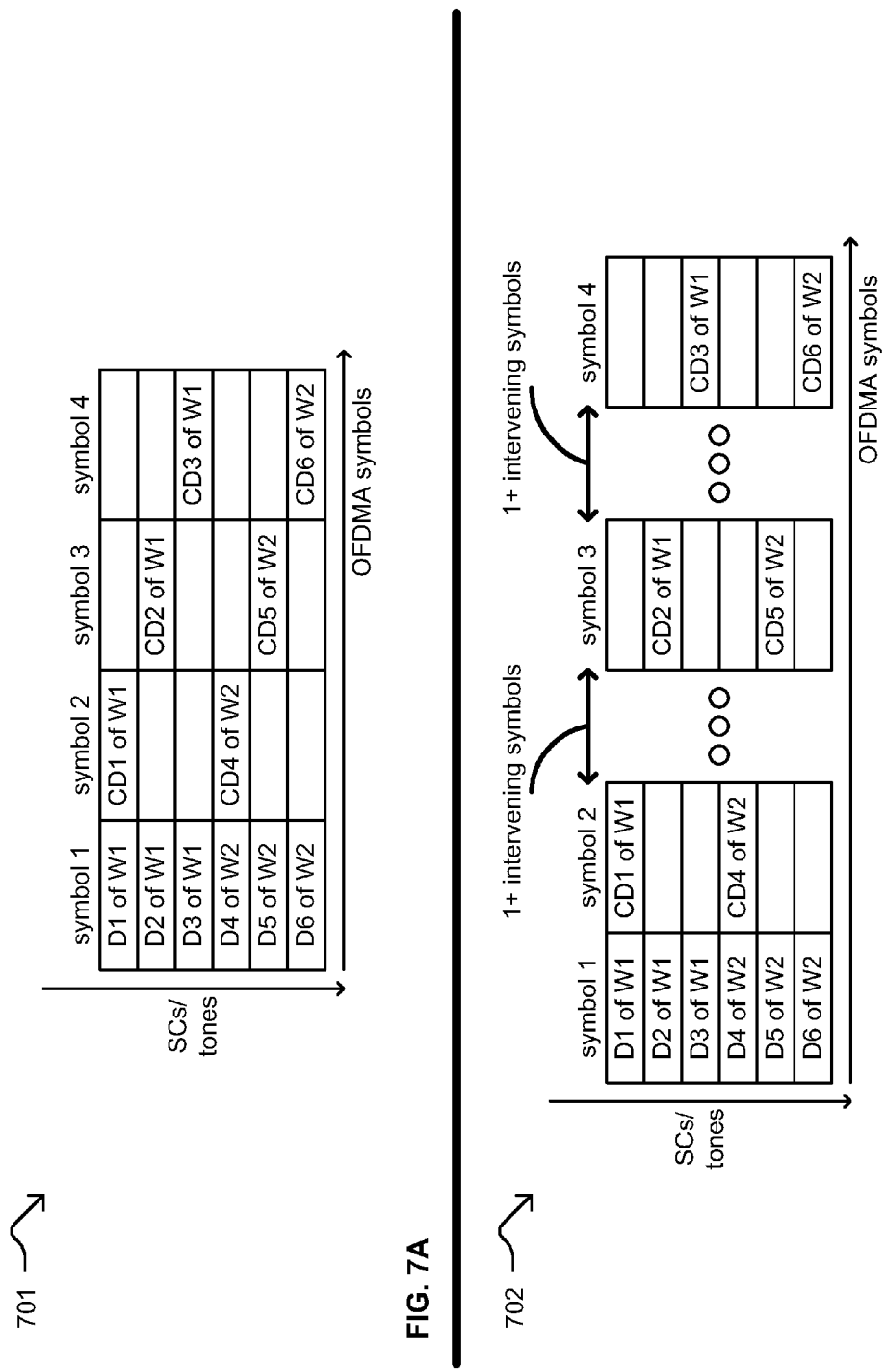
FIG. 7A is a diagram illustrating another example of OFDMA symbols received from other wireless communication devices for use by a wireless communication device to perform CFO estimation.
FIG. 7B is a diagram illustrating another example of OFDMA symbols received from other wireless communication devices for use by a wireless communication device to perform CFO estimation.

FIG. 7A is a diagram illustrating another example 701 of OFDMA symbols received from other wireless communication devices for use by a wireless communication device to perform CFO estimation. In this diagram, a first symbol includes D1 of W1 in a first at least one sub-carrier, D2 of W1 in a second at least one sub-carrier, and D3 of W1 in a third at least one sub-carrier. The first symbol also includes D4 of W2 in a fourth at least one sub-carrier, D5 of W2 in a fifth at least one sub-carrier, and D6 of W2 in a sixth at least one sub-carrier. A second symbol includes CD1 of W1 in the first at least one sub-carrier and CD4 of W2 in the fourth at least one sub-carrier. A third symbol includes CD2 of W1 in the second at least one sub-carrier and CD5 of W2 in the fifth at least one sub-carrier. A fourth symbol includes CD3 of W1 in the third at least one sub-carrier and CD6 of W2 in the sixth at least one sub-carrier.

FIG. 7B is a diagram illustrating another example 702 of OFDMA symbols received from other wireless communication devices for use by a wireless communication device to perform CFO estimation. This diagram includes a similar format to example 701 of FIG. 7A with at least one difference being that one or more intervening symbols are included between the second symbol and the third symbol and also one or more other intervening symbols between the third symbol and the fourth symbol.

Note that other examples may include a similar format to example 701 of FIG. 7A with at least one difference being one or more intervening symbols between the third symbol and the fourth symbol but that the second symbol and the third symbol are successive and adjacent to one another. Yet another example may include a similar format to example 701 of FIG. 7A with at least one difference being one or more intervening symbols between the second symbol and the third symbol but that the third symbol and the fourth symbol are successive and adjacent to one another.

In the above examples, generally speaking, if the repeated data of a symbol is further away from its first/original occurrence in the packet/frame, it will assist for better accuracy but less dynamic range (e.g., maximum CFO estimation range with perhaps lowered accuracy). Alternatively, if the repeated data of a symbol is spaced very closely (e.g., adjacent and successive) in the packet/frame, it will assist for less accuracy but for better or maximum range (e.g., maximum CFO estimation accuracy with perhaps lowered range). However, as shown above, some examples optimize both accuracy and range in CFO estimation by including data.

As mentioned above, different types of data from the various devices or users may be used to perform CFO estimation. Some of the following examples use LTFs as the type of data from various users modulated within the various sub-carriers. Note that such an LTF as shown in many of these diagrams includes information from multiple users (e.g., portion from user #1, portion from user #2, etc.) such that the sub-carriers are split and assigned among different users.

FIG. 8A is a diagram illustrating an example 801 of OFDMA symbols that include long training fields (LTFs) received from other wireless communication devices for use by a wireless communication device to perform CFO estimation. With reference to the trigger frame option as described above, such an OFDMA frame may be implemented as a trigger frame that is used to initiate an Uplink (UL) or multiple user (MU) frame (e.g., an UL orthogonal frequency division multiple access (OFDMA) frame or UL MU frame) that signals the presence and location of the second, third and more LTF symbols. In the diagram, there are 3 LTF symbols shown (e.g., each one depicted as LTF1 that is repeated once in a successive or adjacent symbol or in a following symbol that is separated by at least one intervening symbol or repeated twice in the successive or adjacent symbol and also in the following symbol that is separated by at least one intervening symbol). This example 801 may be implemented as two adjacent symbols. Alternatively, this example 801 may be implemented as two adjacent symbols and a third symbol separated by at least one intervening symbol. In general, the second, third and higher LTF repetitions symbols can be placed at any gap relative to each other in various examples.

FIG. 8B is a diagram illustrating another example 802 of OFDMA symbols that include LTFs received from other wireless communication devices for use by a wireless communication device to perform CFO estimation. The gap between the repeating LTF symbols shown in this diagram may be used for one or more of the following:

(1) LTF for other spatial streams: in multiuser MIMO application, multiple LTFs need to be sent to estimate all spatial streams. In that case, the various LTFs 1 through LTF4 (LTF1-4) split between them tones for the different wireless communication devices or users; and/or (2) The signal field (SIG): in this case, coarse (e.g., that which enables maximum range) CFO is used to estimate the SIG field which uses a relatively low modulation coding set (MCS) (e.g., such as MCS0) and then an extra one or more LTFs are used to improve CFO accuracy for the payload.

FIG. 8C is a diagram illustrating another example 803 of OFDMA symbols that include LTFs received from other wireless communication devices for use by a wireless communication device to perform CFO estimation. In this diagram, note that the SIG field may also use the following structure for UL MU (that is similar to UL OFDMA). In such an implementation, each wireless communication device/user's SIG field is confined to the tone or sub-carrier allocation used for that wireless communication device or user during LTF1. Then, the payload is shared across the bandwidth (e.g., across the sub-carriers allocated for users #1-4).

Figures 9A, 9B, 9C:
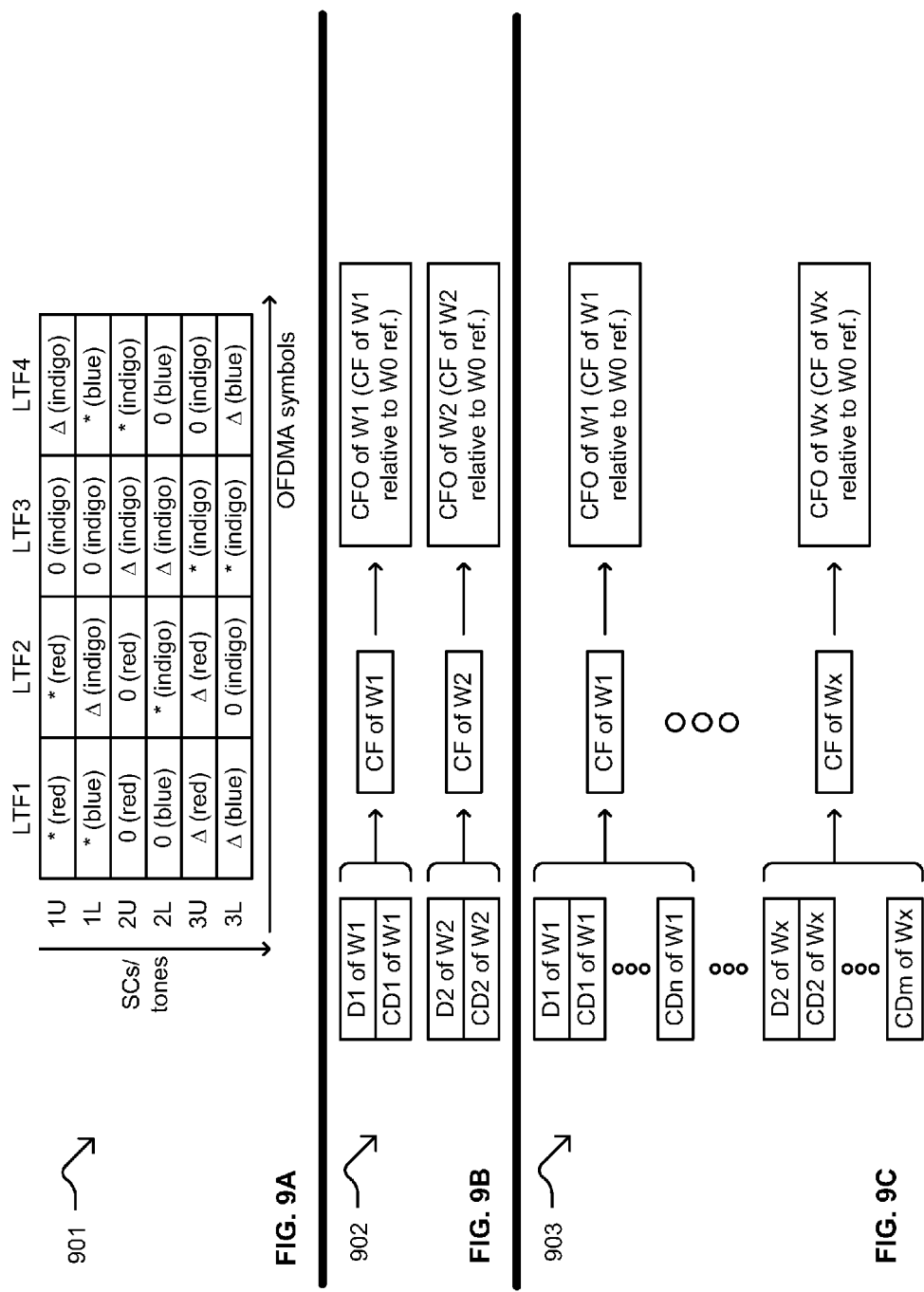
FIG. 9A is a diagram illustrating another example of OFDMA symbols that include LTFs received from other wireless communication devices for use by a wireless communication device to perform CFO estimation.
FIG. 9B is a diagram illustrating an example of processing of data included within OFDMA symbols device to perform CFO estimation.
FIG. 9C is a diagram illustrating another example of processing of data included within OFDMA symbols device to perform CFO estimation.

FIG. 9A is a diagram illustrating another example 901 of OFDMA symbols that include LTFs received from other wireless communication devices for use by a wireless communication device to perform CFO estimation. If both maximum range and maximum accuracy are desired or required in a particular implementation, two (or more) extra LTF symbols can be used for CFO estimation in an optimized solution. However, a more efficient design is provided with respect to this diagram where only one extra LTF is used instead of two.

This can be achieved by repeating half of the tones or sub-carriers for each wireless communication device or user in the adjacent LTF and repeating the other half of sub-carriers in the far away LTF. The diagram shows an example of 3 wireless communication devices or users (e.g., WDEV 1, WDEV 2, and WDEV 3 or user #1, user #2, and user #3) using 4 LTFs to estimate channels, coarse (maximum range) frequency estimation, and fine (maximum accuracy) frequency estimation and can be extended similarly to any number of wireless communication devices/users and spatial streams.

In the diagram, each column shows one LTF and each row shows groups of tones or sub-carriers (e.g., a group can be contiguous as shown or non-contiguous in an alternative implementation).

The symbols '*', 'o', and 'Δ' denote wireless communication devices or users. Each wireless communication device or user is allocated two half groups in each LTF as shown. With 4 LTFs, each communication device or user is allocated on every sub-carrier, so channels of every communication device or user can be estimated. The upper halves of LTF1 and LTF2 (red color) can be used for coarse frequency estimation. The lower halves of LTF1 and LTF4 (blue color) can be used for fine frequency estimation.

As can be seen with respect to the many various examples and embodiments described herein, dynamic assignment of sub-carriers to different devices and/or users may be made with respect to different symbols and as a function of time. The same sub-carrier may be used to convey data for two or more different devices and/or users. Also, different degrees of spacing may be made between symbols to optimize range and/or accuracy of CFO estimation. Any desired combination of successive or adjacent symbols or cymbals spaced apart by one or more intervening symbols may be used in various embodiments and examples to optimize various degrees of range and/or accuracy. Note also that some implementations may weigh the consideration of range relatively more than the consideration of accuracy, while other implementations may weigh accuracy relatively more than range.

FIG. 9B is a diagram illustrating an example 902 of processing of data included within OFDMA symbols device to perform CFO estimation. Regardless of the particular arrangement of data and copies/repeats of that data in various sub-carriers in accordance with any of the various examples or embodiments described herein, a receiver device (W0) includes circuitry and capability to process first data from a first transmitter device (D1 of W1) and a copy of that first data (CD1) of W1 to determine a carrier frequency (CF) of W1 and also to process second data from a second transmitter device (D2 of W2) and a copy of that second data (CD2) of W2 to determine a carrier frequency (CF) of W2. The receiver (W0) device also includes circuitry and capability to determine any CFO of W1 and any CFO of W2 based on the first and second carrier frequencies of W1 and W2 and a frequency reference of the receiver devoice (W0).

FIG. 9C is a diagram illustrating another example 903 of processing of data included within OFDMA symbols device to perform CFO estimation. Regardless of the particular arrangement of data and copies/repeats of that data in various sub-carriers in accordance with any of the various examples or embodiments described herein, a receiver device (W0) includes circuitry and capability to process first data from a first transmitter device (D1 of W1) and a first copy of that first data (CD1) of W1, and up to an n-th copy of that first data (CDn) of W1 to determine a carrier frequency (CF) of W1. The receiver device (W0) includes circuitry and capability to process second data from an x-th transmitter device (D2 of Wx), a first copy of that second data (CD2) of Wx, and up to an m-th copy of that second data (CDm) of Wx to determine a carrier frequency (CF) of W2. The receiver (W0) device also includes circuitry and capability to determine any CFO of W1 and any CFO of Wx based on the first and x-th carrier frequencies of W1 and Wx and a frequency reference of the receiver devoice (W0).

Figures 10A, 10B:
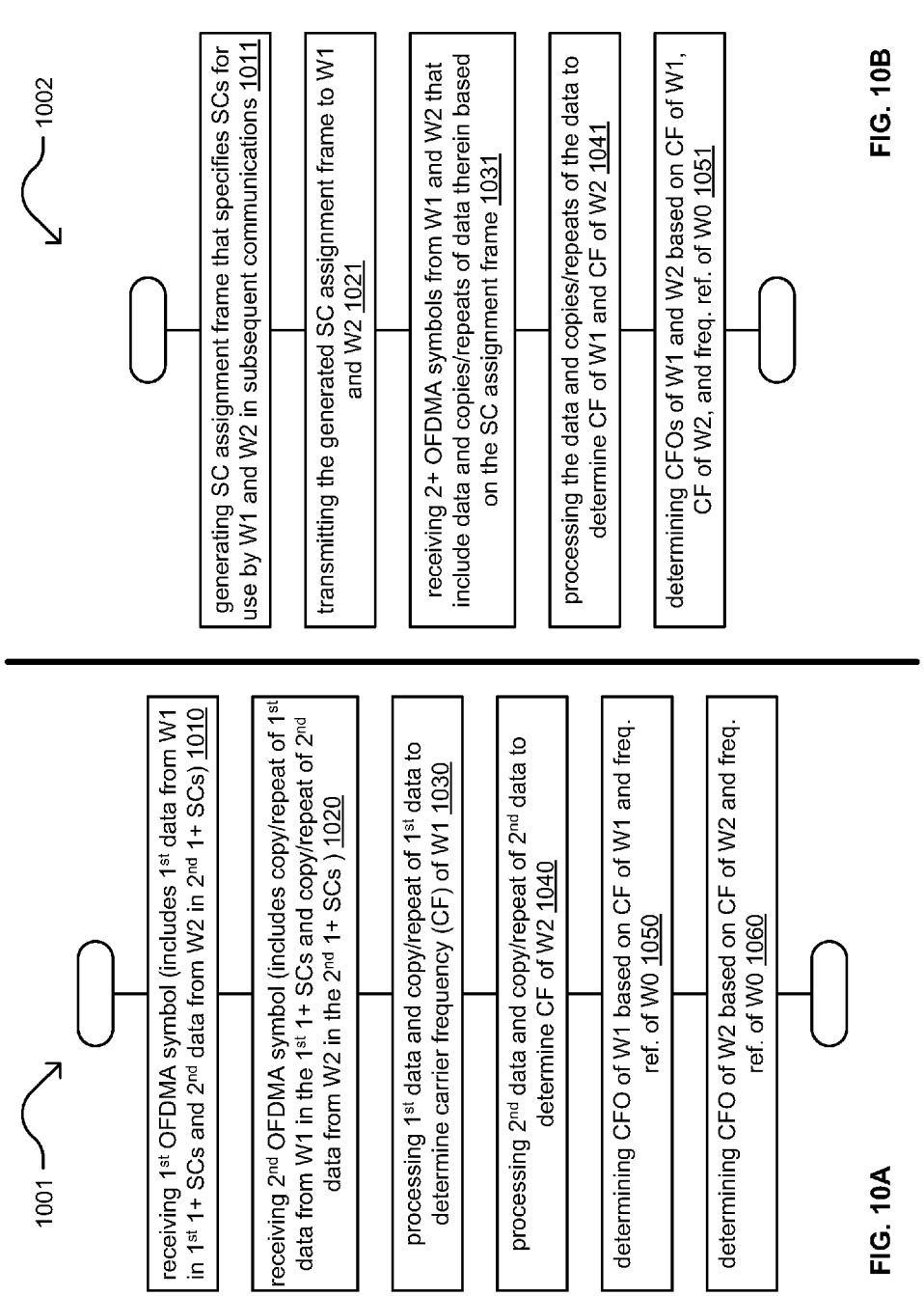
FIG. 10A is a diagram illustrating an embodiment of a method for execution by one or more wireless communication devices.
FIG. 10B is a diagram illustrating another embodiment of a method for execution by one or more wireless communication devices.

FIG. 10A is a diagram illustrating an embodiment of a method 1001 for execution by one or more wireless communication devices. The method 1001 begins by receiving, via a communication interface of the wireless communication device, a first orthogonal frequency division multiple access (OFDMA) symbol that includes first data from a first other wireless communication device (W1) modulated on a first at least one sub-carrier and second data from a second other wireless communication device (W2) modulated on a second at least one sub-carrier (block 1010).

The method 1001 continues by receiving, via the communication interface of the wireless communication device, a second OFDMA symbol that includes a copy of the first data from the first other wireless communication device (W1) modulated on the first at least one sub-carrier and a copy of the second data from the second other wireless communication device (W2) modulated on the second at least one sub-carrier (block 1020).

The method 1001 then operates by processing the first data and the copy of the first data to determine a first carrier frequency associated with the first other wireless communication device (W1) (block 1030). The method 1001 continues by processing the second data and the copy of the second data to determine a second carrier frequency associated with the second other wireless communication device (W2) (block 1040).

The method 1001 then operates by determining a first carrier frequency offset (CFO) associated with the first other wireless communication device (W1) based on the first carrier frequency and a frequency reference associated with the wireless communication device performing the method 1001 (W0) (block 1050). The method 1001 continues by determining a second CFO associated with the second other wireless communication device (W2) based on the second carrier frequency and the frequency reference associated with the wireless communication device performing the method 1001 (W0) (block 1060).

Note that once any CFOs of the first and second wireless communication devices (W1 and W2) are determined by the wireless communication device performing the method 1001 (W0), the wireless communication device performing the method 1001 (W0) can use those CFOs to modify or adapt any communications intended for or received from the first and second wireless communication devices (W1 and W2) based on those CFOs.

FIG. 10B is a diagram illustrating another embodiment of a method 1002 for execution by one or more wireless communication devices. The method 1002 begins by generating a sub-carrier assignment frame that specifies sub-carriers for use by first and second wireless communication devices (W1 and W2) in subsequent communication (block 1011). The method 1002 continues by transmitting the generated sub-carrier assignment frame to the first and second wireless communication devices (W1 and W2) (block 1021). The method 1002 then operates by receiving two or more OFDMA symbols from the first and second wireless communication devices (W1 and W2) that include data and copies or repeats of that data therein based on the sub-carrier assignment frame (block 1031).

The method 1002 continues by processing the data and the copies of the data to determine the carrier frequencies of the first and second wireless communication devices (W1 and W2) (block 1041). The method 1002 then operates by determining any CFOs of the first and second wireless communication devices (W1 and W2) based on the carrier frequencies of the first and second wireless communication devices (W1 and W2) (block 1051).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface; and
   a processor, the processor and the communication interface configured to:
      receive a first orthogonal frequency division multiple access (OFDMA) symbol that includes first data from a first other wireless communication device modulated on a first at least one sub-carrier and second data from a second other wireless communication device modulated on a second at least one sub-carrier;
      receive a second OFDMA symbol that includes a copy of the first data from the first other wireless communication device modulated on the first at least one sub-carrier and a copy of the second data from the second other wireless communication device modulated on the second at least one sub-carrier;
      process the first data and the copy of the first data to determine a first carrier frequency associated with the first other wireless communication device;
      process the second data and the copy of the second data to determine a second carrier frequency associated with the second other wireless communication device;
      determine a first carrier frequency offset (CFO) associated with the first other wireless communication device based on the first carrier frequency and a frequency reference associated with the wireless communication device; and
      determine a second CFO associated with the second other wireless communication device based on the second carrier frequency and the frequency reference associated with the wireless communication device.

2. The wireless communication device of claim 1, wherein the processor and the communication interface are further configured to:
   generate a sub-carrier assignment frame that specifies the first at least one sub-carrier for modulation of the first data and the copy of the first data by the first other wireless communication device and the second at least one sub-carrier for modulation of the second data and the copy of the second data by the second other wireless communication device within the first OFDMA symbol and the second OFDMA symbol; and
   transmit the sub-carrier assignment frame to the first other wireless communication device and the second other wireless communication device before receiving the first OFDMA symbol and the second OFDMA symbol.

3. The wireless communication device of claim 2, wherein the processor and the communication interface are further configured to:
   generate the sub-carrier assignment frame that also specifies at least one of a third at least one sub-carrier for modulation of third data by the first other wireless communication device or a fourth at least one sub-carrier for modulation of fourth data by the second other wireless communication device within a third OFDMA symbol; and
   transmit the sub-carrier assignment frame to the first other wireless communication device and the second other wireless communication device before receiving the first OFDMA symbol, the second OFDMA symbol, and the third OFDMA symbol.

4. The wireless communication device of claim 2, wherein the processor and the communication interface are further configured to:
   generate the sub-carrier assignment frame that also specifies at least one of the first at least one sub-carrier for modulation of third data by the second other wireless communication device or the second at least one sub-carrier for modulation of fourth data by the first other wireless communication device within a third OFDMA symbol; and
   transmit the sub-carrier assignment frame to the first other wireless communication device and the second other wireless communication device before receiving the first OFDMA symbol, the second OFDMA symbol, and the third OFDMA symbol.

5. The wireless communication device of claim 1, wherein the processor and the communication interface are further configured to:
   receive the first OFDMA symbol that also includes third data from the first other wireless communication device modulated on a third at least one sub-carrier and fourth data from the second other wireless communication device modulated on a fourth at least one sub-carrier;
   receive a third OFDMA symbol that includes a copy of the third data from the first other wireless communication device modulated on the third at least one sub-carrier and a copy of the fourth data from the second other wireless communication device modulated on the fourth at least one sub-carrier, wherein the second OFDMA symbol and the third OFDMA symbol are separated by at least one other OFDMA symbol;
   process the first data, the copy of the first data, the third data, and the copy of the third data to determine the first carrier frequency associated with the first other wireless communication device; and
   process the second data, the copy of the second data, the fourth data, and the copy of the fourth data to determine the second carrier frequency associated with the second other wireless communication device.

6. The wireless communication device of claim 1, wherein the processor and the communication interface are further configured to:
   receive an OFDMA packet that includes the first OFDMA symbol and the second OFDMA symbol within a multiple user (MU) transmission from the first other wireless communication device and the second other wireless communication device.

7. The wireless communication device of claim 6, wherein the OFDMA packet includes a first long training field (LTF) field that is based on the first OFDMA symbol and a second LTF that is based on the second OFDMA symbol.

8. The wireless communication device of claim 1 further comprising:
an access point (AP), wherein the first other wireless communication device is a first wireless station (STA), and the second other wireless communication device is a second STA.

9. A wireless communication device comprising:
a communication interface; and
a processor, the processor and the communication interface configured to:
receive a first orthogonal frequency division multiple access (OFDMA) symbol that includes first data from a first other wireless communication device modulated on a first at least one sub-carrier, second data from the first other wireless communication device modulated on a second at least one sub-carrier, third data from a second other wireless communication device modulated on a third at least one sub-carrier, and fourth data from the second other wireless communication device modulated on a fourth at least one sub-carrier;
receive a second OFDMA symbol that includes a copy of the first data from the first other wireless communication device modulated on the first at least one sub-carrier and a copy of the third data from the second other wireless communication device modulated on the third at least one sub-carrier;
receive a third OFDMA symbol that includes a copy of the second data from the first other wireless communication device modulated on the second at least one sub-carrier and a copy of the fourth data from the second other wireless communication device modulated on the fourth at least one sub-carrier, wherein the second OFDMA symbol and the third OFDMA symbol are separated by at least one other OFDMA symbol;
process the first data, the copy of the first data, the second data, and the copy of the second data to determine a first carrier frequency associated with the first other wireless communication device;
process the third data, the copy of the third data, the fourth data, and the copy of the fourth data to determine a second carrier frequency associated with the second other wireless communication device;
determine a first carrier frequency offset (CFO) associated with the first other wireless communication device based on the first carrier frequency and a frequency reference associated with the wireless communication device; and
determine a second CFO associated with the second other wireless communication device based on the second carrier frequency and the frequency reference associated with the wireless communication device.

10. The wireless communication device of claim 9, wherein the processor and the communication interface are further configured to:
generate a sub-carrier assignment frame that specifies the first at least one sub-carrier for modulation of the first data and the copy of the first data by the first other wireless communication device, the second at least one sub-carrier for modulation of the second data and the copy of the second data by the first other wireless communication device, the third at least one sub-carrier for modulation of the third data and the copy of the third data by the second other wireless communication device, and the fourth at least one sub-carrier for modulation of the fourth data and the copy of the fourth data by the second other wireless communication device within the first OFDMA symbol, the second OFDMA symbol, and the third OFDMA symbol; and
transmit the sub-carrier assignment frame to the first other wireless communication device and the second other wireless communication device before receiving the first OFDMA symbol, the second OFDMA symbol, and the third OFDMA symbol.

11. The wireless communication device of claim 9, wherein the processor and the communication interface are further configured to:
receive an OFDMA packet that includes the first OFDMA symbol and the second OFDMA symbol within a multiple user (MU) transmission from the first other wireless communication device and the second other wireless communication device.

12. The wireless communication device of claim 11, wherein the OFDMA packet includes a first long training field (LTF) field that is based on the first OFDMA symbol, a second LTF that is based on the second OFDMA symbol, and a third LTF that is based on the third OFDMA symbol.

13. The wireless communication device of claim 9 further comprising:
an access point (AP), wherein the first other wireless communication device is a first wireless station (STA), and the second other wireless communication device is a second STA.

14. A method for execution by a wireless communication device, the method comprising:
receiving, via a communication interface of the wireless communication device, a first orthogonal frequency division multiple access (OFDMA) symbol that includes first data from a first other wireless communication device modulated on a first at least one sub-carrier and second data from a second other wireless communication device modulated on a second at least one sub-carrier;
receiving, via the communication interface of the wireless communication device, a second OFDMA symbol that includes a copy of the first data from the first other wireless communication device modulated on the first at least one sub-carrier and a copy of the second data from the second other wireless communication device modulated on the second at least one sub-carrier;
processing the first data and the copy of the first data to determine a first carrier frequency associated with the first other wireless communication device;
processing the second data and the copy of the second data to determine a second carrier frequency associated with the second other wireless communication device;
determining a first carrier frequency offset (CFO) associated with the first other wireless communication device based on the first carrier frequency and a frequency reference associated with the wireless communication device; and
determining a second CFO associated with the second other wireless communication device based on the second carrier frequency and the frequency reference associated with the wireless communication device.

15. The method of claim 14 further comprising:
generating a sub-carrier assignment frame that specifies the first at least one sub-carrier for modulation of the first data and the copy of the first data by the first other wireless communication device and the second at least one sub-carrier for modulation of the second data and the copy of the second data by the second other wireless communication device within the first OFDMA symbol and the second OFDMA symbol; and transmitting, via the communication interface of the wireless communication device, the sub-carrier assignment frame to the first other wireless communication device and the second other wireless communication device before receiving the first OFDMA symbol and the second OFDMA symbol.

16. The method of claim 15 further comprising:

generating the sub-carrier assignment frame that also specifies at least one of the first at least one sub-carrier for modulation of third data by the second other wireless communication device or the second at least one sub-carrier for modulation of fourth data by the first other wireless communication device within a third OFDMA symbol; and transmitting, via the communication interface of the wireless communication device, the sub-carrier assignment frame to the first other wireless communication device and the second other wireless communication device before receiving the first OFDMA symbol, the second OFDMA symbol, and the third OFDMA symbol.

17. The method of claim 14 further comprising:

receiving, via the communication interface of the wireless communication device, the first OFDMA symbol that also includes third data from the first other wireless communication device modulated on a third at least one sub-carrier and fourth data from the second other wireless communication device modulated on a fourth at least one sub-carrier;

receiving, via the communication interface of the wireless communication device, a third OFDMA symbol that includes a copy of the third data from the first other wireless communication device modulated on the third at least one sub-carrier and a copy of the fourth data from the second other wireless communication device modulated on the fourth at least one sub-carrier, wherein the second OFDMA symbol and the third OFDMA symbol are separated by at least one other OFDMA symbol;

processing the first data, the copy of the first data, the third data, and the copy of the third data to determine the first carrier frequency associated with the first other wireless communication device; and processing the second data, the copy of the second data, the fourth data, and the copy of the fourth data to determine the second carrier frequency associated with the second other wireless communication device.

18. The method of claim 14 further comprising:

receiving, via the communication interface of the wireless communication device, an OFDMA packet that includes the first OFDMA symbol and the second OFDMA symbol within a multiple user (MU) transmission from the first other wireless communication device and the second other wireless communication device.

19. The method of claim 18, wherein the OFDMA packet includes a first long training field (LTF) field that is based on the first OFDMA symbol and a second LTF that is based on the second OFDMA symbol.

20. The method of claim 14, wherein the wireless communication device is an access point (AP), and the first other wireless communication device is a first wireless station (STA), and the second other wireless communication device is a second STA.

* * * * *